United States Patent
Ouellette

(10) Patent No.: US 6,287,055 B1
(45) Date of Patent: Sep. 11, 2001

(54) AIR CONVEYOR NECK RING CHANGE-OVER WITH VERTICAL PIVOT SECTION

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 09/337,992

(22) Filed: Jun. 22, 1999

(51) Int. Cl.$^7$ ................................................. B65G 53/16
(52) U.S. Cl. ............................ 406/88; 406/86; 198/626.1
(58) Field of Search ..................... 406/86, 88; 198/626.1

(56) References Cited

U.S. PATENT DOCUMENTS

| | | | |
|---|---|---|---|
| 4,284,370 | * | 8/1981 | Danler et al. .......................... 406/86 |
| 5,147,153 | * | 9/1992 | Aidlin et al. ........................... 406/86 |
| 5,161,919 | * | 11/1992 | Smith et al. ........................... 406/86 |
| 5,246,314 | * | 9/1993 | Smith et al. ........................... 406/86 |
| 5,611,647 | * | 3/1997 | Ouellette ............................... 406/88 |
| 5,628,588 | | 5/1997 | Ouellette . |
| 5,628,605 | * | 5/1997 | Miyoshi ................................. 414/331 |
| 5,810,516 | * | 9/1998 | Ouellette ............................... 406/86 |
| 5,947,647 | * | 9/1999 | Ouellette ............................... 406/191 |
| 5,950,804 | * | 9/1999 | Farkas ................................. 198/626.1 |
| 5,951,211 | * | 9/1999 | Ouellette ............................... 406/88 |
| 6,024,518 | * | 2/2000 | Ouellette ............................... 406/88 |
| 6,079,541 | * | 6/2000 | Bercelli et al. ................... 198/377.03 |

FOREIGN PATENT DOCUMENTS

405246542 * 9/1993 (JP).

OTHER PUBLICATIONS

Beverage World Magazine, Charles E. Morris, Profiles in Flexible Manufacturing, 11/1995.*

* cited by examiner

*Primary Examiner*—Robert P. Olszewski
*Assistant Examiner*—Richard Ridley
(74) *Attorney, Agent, or Firm*—Howell & Haferkamp, L.C.

(57) ABSTRACT

A multichannel pivoting coupling between an upstream multichannel air conveyor and a downstream multichannel air conveyor includes a mechanism that can be selectively controlled to simultaneously adjust the lateral width dimensions of the slots between opposed flanges of the coupling to coincide with adjustments in the lateral width dimensions of the slots between the opposed flanges of the upstream and downstream multichannel air conveyors. The multichannel air conveyors of the type employed with the pivoting coupling apparatus convey streams of plastic bottles suspended by their neck rings in the slots and the lateral spacing between pairs of flanges that define the slots can be quickly changed over for conveying plastic bottles of different neck dimensions and different neck ring diameters.

19 Claims, 9 Drawing Sheets

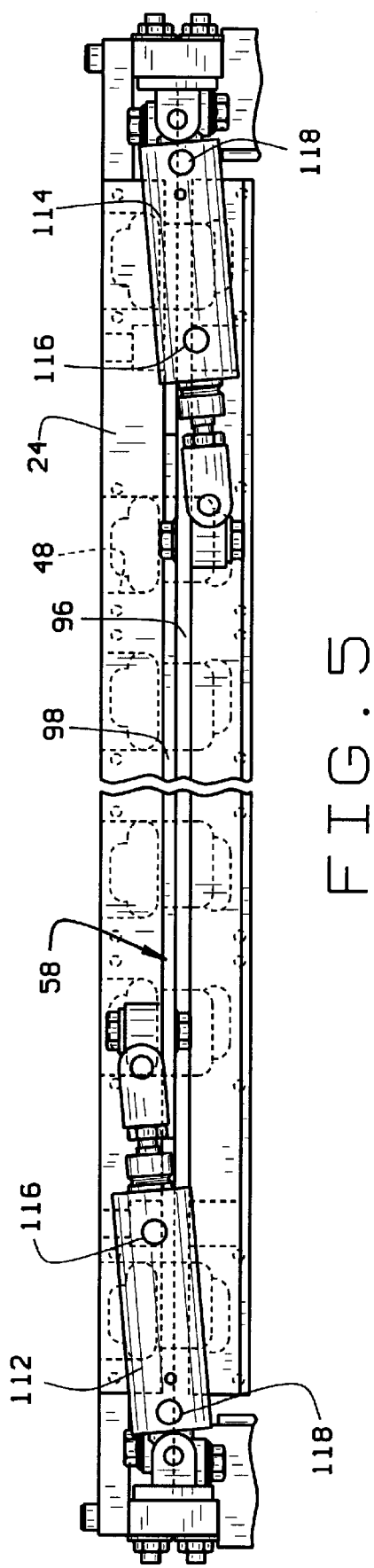
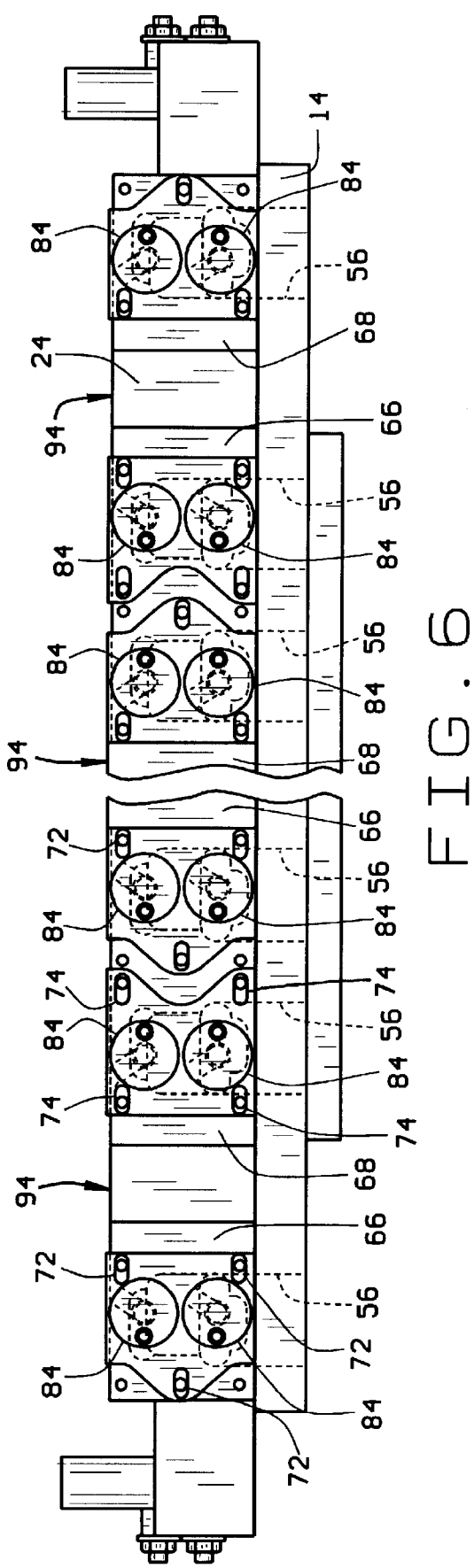

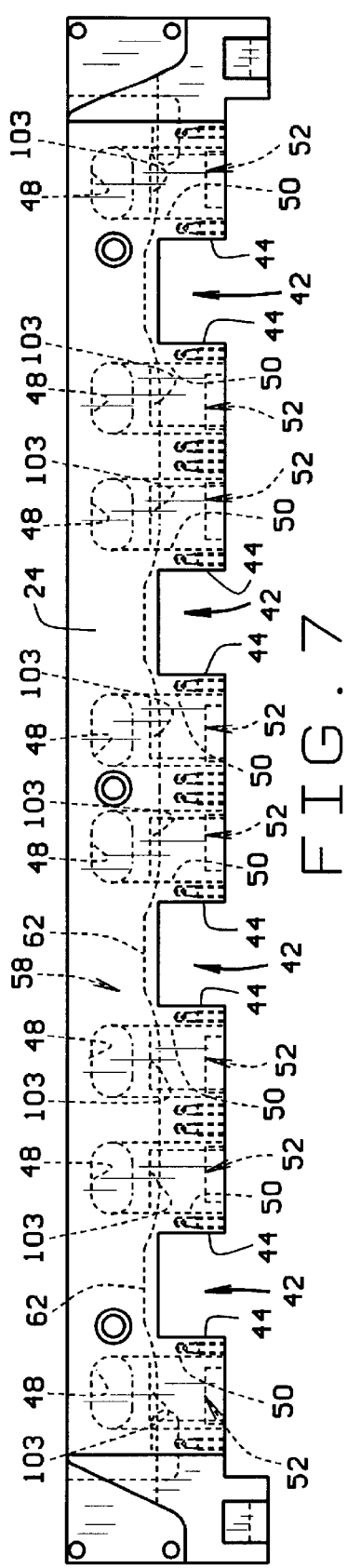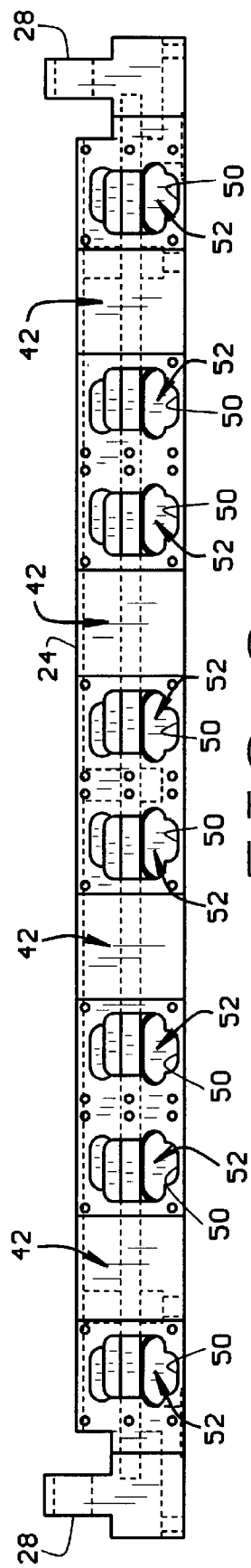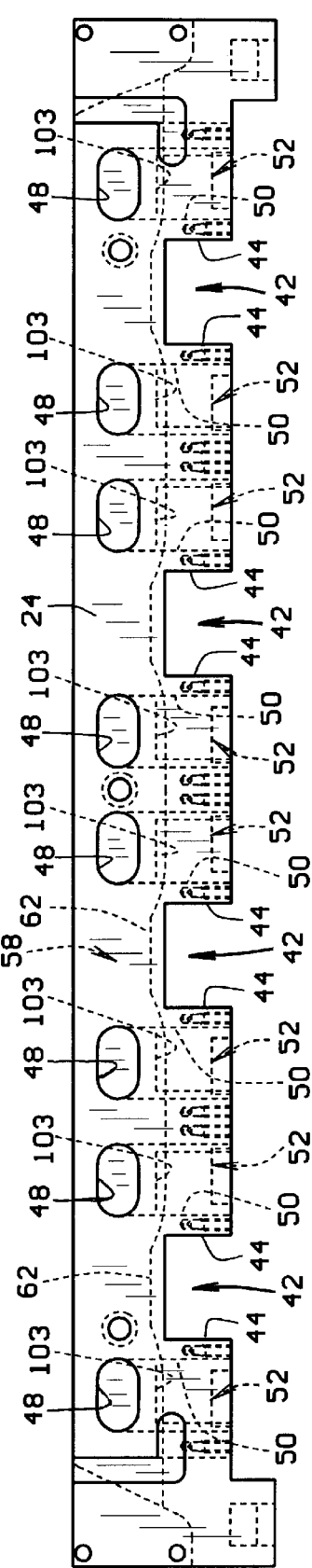

AIR CONVEYOR NECK RING CHANGE-OVER WITH VERTICAL PIVOT SECTION

BACKGROUND OF THE INVENTION (1) Field of the Invention

The present invention pertains to a coupling apparatus that is designed to provide a vertical pivoting coupling between an upstream multichannel air conveyor and a downstream multichannel air conveyor enabling the downstream multichannel air conveyor to be moved vertically between upwardly inclined and downwardly inclined orientations relative to the upstream air conveyor. In particular, the present invention provides a multichannel pivoting connection between an upstream multichannel air conveyor and a downstream multichannel air conveyor. The connection mechanism that can be selectively controlled to simultaneously adjust the lateral width dimensions of the slots between opposed flanges of the connection to coincide with adjustments in the lateral width dimensions of the slots between the opposed flanges of the upstream and downstream multichannel air conveyors. The multichannel air conveyors of the type employed with the pivoting coupling apparatus of the invention convey streams of plastic bottles suspended by their neck rings in the slots and the lateral spacing between pairs of flanges that define the slots can be quickly changed over for conveying plastic bottles of different neck dimensions and different neck ring diameters.

(2) Description of the Related Art

Air conveyors are typically employed in the rapid transport of empty plastic bottles of the type having an annular rim or a neck ring at the top of the bottle neck. A typical air conveyor includes a pair of flanges that are spaced from each other defining an elongated slot between the flanges. A multichannel air conveyor includes a multiple of pairs of flanges that extend side-by-side, defining a multiple of conveying slots. For air conveyors of considerable longitudinal length, conveyor sections are connected end-to-end so that the pairs of flanges of one section are aligned with the pairs of flanges of other adjacent conveyor sections and the slots of the pairs of flanges, aligned end-to-end, define the conveyor path. The spacings between the flanges of the conveyor sections is sufficiently large to enable a portion of the bottle neck just below the neck ring to pass through the spacing with the bottle suspended from the top surfaces of the flanges by the neck ring engaging on the top surfaces. A series of air jets or orifices are positioned along the flanges above and/or below the flanges. A plenum of the air conveyor sections supplies a flow of air to the orifices. The orifices are oriented so that air ejected from the orifices will contact the plastic bottles pushing the bottles along the pathway defined by the elongated slots of the aligned pairs of conveyor flanges with the neck rings of the bottles sliding along the top surfaces of the pairs of flanges. An example of this type of conveyor is disclosed in the of Ouellette U.S. Pat. No. 5,628,588, issued May 13, 1997 and incorporated herein by reference. Multichannel air conveyors are basically the same as that disclosed in the patent, except that they include a multiple of pairs of flanges that extend side-by-side, defining a multiple of conveyor slots.

In some types of air conveyors the opposed flanges that define the slot of the conveyor path are mounted in laterally spaced side walls of the air conveyor that define a conveying channel between the side walls. Air ducts also pass through these pairs of side walls feeding the flow of air to the orifices that also emerge from these side walls. The side walls are provided with mutually opposed, longitudinally extending grooves. The pairs of flanges are mounted in these grooves. The grooves are designed to be sufficiently deep so that the flanges can be adjustably positioned in the grooves enabling the pair of opposed flanges to be moved laterally toward each other or laterally away from each other. This enables the lateral spacing between the pairs of flanges that defines the conveyor slot to be adjusted to accommodate different diameter neck rings of bottles to be conveyed through the conveyor, for example, an adjustment between the typical 28 mm thread diameter bottle neck and the 38 mm thread diameter bottle neck. The flanges are secured in the grooves in their relative adjusted positions by a series of set screws that are spacially arranged along the length of the conveyor channel side walls and are tightened down to secure the flanges in their adjusted positions in the opposed grooves of the side walls.

Although the ability to adjust the lateral spacing between the opposed flanges of an air conveyor is a very desirable feature in order to be able to use the same air conveyor in conveying plastic bottles of different neck diameters, the desirable flange lateral adjustment feature of this type of air conveyor has the disadvantage of the time required to adjust or change the lateral spacing between the flanges of each conveyor section. For each conveyor section the series of set screws along the lower sections of the conveyor channel side walls must first be loosened. Then, the opposed pairs of flanges are moved to their new adjusted positions and then each of the plurality of set screws in the opposed lower sections of the channel side walls along the longitudinal length of the conveyor section must be tightened down while the pair of opposed flanges are held in their new adjusted positions. This adjustment procedure is very time consuming for a single length of an air conveyor. The time involved in the adjustments can be multiplied several times for an air conveying system that is comprised of several sections of air conveyors. The time involved in adjusting the lateral spacing between opposed pairs of conveyor flanges is multiplied even further in the case of multichannel air conveyors.

The problem of down time in adjusting the lateral spacing between opposed pairs of flanges of air conveyors has been addressed and overcome by an apparatus that automatically and simultaneously changes over the lateral slot spacing between adjacent pairs of conveyor flanges between two previously determined and previously adjusted lateral slot spacings. The apparatus that performs this function is disclosed in the pending of Ouellette, U.S. patent application Ser. No. 09/228,831, incorporated herein by reference. However, the apparatus disclosed in the patent application is employed on horizontal lengths or sections of air conveyors. It is often necessary to join adjacent lengths of air conveyors by a pivoting connection, for example, a connection that would allow a downstream air conveyor section to pivot vertically relative to an upstream air conveyor section. Connecting adjacent lengths of air conveyors by a pivoting connection is made more complicated where the air conveyor sections have automatically adjustable flange spacings such as that disclosed in the above-referenced patent application. This is made even more complicated where the adjacent lengths of air conveyors are multichannel air conveyors that have automatically adjustable flange spacings. Such a pivoting connection would not only require that the downstream air conveyor section be capable of pivoting relative to the upstream air conveyor section, but it would also have to include opposed pairs of flanges that are laterally adjustable between two lateral spacings that would match the lateral adjustability of the opposed pairs of flanges of the upstream air conveyor and the downstream air conveyor section.

SUMMARY OF THE INVENTION

The present invention overcomes the disadvantages described above by providing a vertically pivoting connection apparatus for multichannel air conveyors that includes a mechanism for quickly changing over the lateral spacing width between pairs of opposed flanges of the connection between two previously determined and previously adjusted spacing distances, for example the lateral spacing distances that accommodate both the typical 28 mm thread diameter plastic bottle and the 38 mm thread diameter plastic bottle.

In the preferred embodiment of the invention it connects an upstream, longitudinally extending multichannel air conveyor to a downstream, longitudinally extending multichannel air conveyor. In addition, the connection the apparatus of the invention provides between the upstream and downstream multichannel air conveyors is a pivoting connection that enables the downstream air conveyor to be inclined upwardly or downwardly relative to the horizontally extending upstream air conveyor. Each of the air conveyors have a multiple of slots defined by the pairs of opposed flanges of each air conveyor. The slots define the flow paths or multiple channels through which the necks and neck rings of streams of plastic bottles are conveyed. In this preferred embodiment, the pairs of flanges of both the upstream and downstream air conveyors are adjustable laterally inwardly and outwardly to accommodate bottles having different neck dimensions and neck ring diameters. The apparatus of the invention receives the stream of bottles from the upstream air conveyor and conveys the stream of bottles to the downstream air conveyor, and therefore also has the same number of bottle conveying channels as the two conveyor sections. The channels are each defined by mutually opposed pairs of flanges that are capable of being laterally adjusted toward and away from each other, just as the pairs of flanges of the upstream air conveyor section and the downstream air conveyor section.

The apparatus of the invention is comprised of an upstream base and a downstream base that are connected together by two pivot joints on laterally opposite sides of the two bases. The upstream base is connected to the upstream air conveyor and receives a flow of air from the plenum of the upstream air conveyor. In a like manner, the downstream base is connected to the downstream air conveyor and receives a flow of air from the plenum of downstream air conveyor. The connection provided by the apparatus enables the downstream air conveyor to pivot vertically relative to the upstream air conveyor. Both the upstream base and the downstream base are similar in construction to each other, and therefore only the upstream base will be further described.

The upstream base has a multiple of longitudinally extending slots formed in its underside that are defined by opposed pairs of downwardly depending side walls of the base. Each of the slots aligns with an air conveyor slot of the upstream air conveyor. Pairs of laterally spaced and mutually opposed flanges are mounted to the bottoms of the base side walls for sliding movement laterally toward and away from each other. Each flange as a pair of nozzle heads that depend downwardly from the flange and reciprocate laterally with the flange. The nozzle heads each have an air ejecting orifice that is oriented to direct air toward a bottle suspended in the slot by the pair of opposed flanges to push the bottle through the slot toward the downstream air conveyor. The base has a plurality of air flow conducting passages that receive air flow from the plenum of the upstream air conveyor and direct the air flow to the air ejecting orifices of the nozzle heads. A lateral slot is cut into the top of the base. The slot has a lateral sliding surface at its bottom in the interior of the base. A plurality of vertical air flow passages, equal in number to the plurality of flanges extend downwardly through the base. The vertical passages extend downwardly through the side walls of the base and open through the bottoms of the side walls. These vertical passages provide air flow to the nozzle heads on the flanges.

A pair of laterally extending racks are mounted side-by-side in the slot of the base. The lateral length of the racks is slightly smaller than that of the slot, enabling the racks to reciprocate side-by-side laterally through the slot. Each rack has a plurality of fingers that extend downwardly from the rack through one of the vertical air flow passages of the base. A first of the two racks has fingers that extend downwardly through the vertical passages of the base and engage with a first flange of each pair of flanges. A second rack of the pair of racks has fingers that extend downwardly through the vertical passages of the base and engage with a second flange of each pair of flanges. Thus, by laterally reciprocating the first and second racks in opposite directions in the base slot, the first and second flanges of each pair of opposed flanges are simultaneously moved laterally toward and away from each other. The lateral reciprocating movement of the racks is adjustable and by the adjustment of the extent of their lateral movement the lateral spacing between the pairs of flanges can be adjusted between first and second laterally spaced positions of the flanges.

The actuator mechanism of the apparatus that drives the reciprocating movement of the first and second racks is provided by first and second pneumatic actuators. A control system for the apparatus selectively supplies air pressure to the first and second actuators to cause piston rods extending from the actuators to be reciprocated between first and second, extended and retracted positions. The piston rods of the first and second actuators are connected to the first and second racks, respectively. Thus, when the first and second actuators are selectively supplied with pressure to control their piston rods to be extended and retracted, the first and second racks are laterally reciprocated in the base slot and the first and second flanges of each pair of flanges are moved between their first lateral spacing and second lateral spacing.

Thus, the apparatus of the invention provides a pivoting connection between adjacent lengths of multichannel air conveyors and includes a mechanism that can be selectively controlled to simultaneously adjust the lateral width dimension of the slots between opposed flanges of a multichannel air conveyor. When employed with a multichannel air conveyor that conveys plastic bottles suspended by their neck rings in the slots, the apparatus quickly changes over the air conveyor for conveying plastic bottles of different neck dimensions and neck ring diameters.

BRIEF DESCRIPTION OF THE DRAWINGS

Further objects and features of the invention are revealed in the following detailed description of the preferred embodiment of the invention and in the drawing figures, wherein:

FIG. 5 is a top plan view of the base section of FIG. 4;

FIG. 6 is a bottom plan view of the base section of FIG. 4;

FIG. 7 is a view of the base section of FIG. 4 removed from the apparatus of the invention;

FIG. 8 is a bottom plan view of the base section of FIG. 7;

FIG. 9 is an elevation view of the opposite side of the base section of FIG. 7;

DETAILED DESCRIPTION OF THE PREFERRED EMBODIMENT

Figure 1:
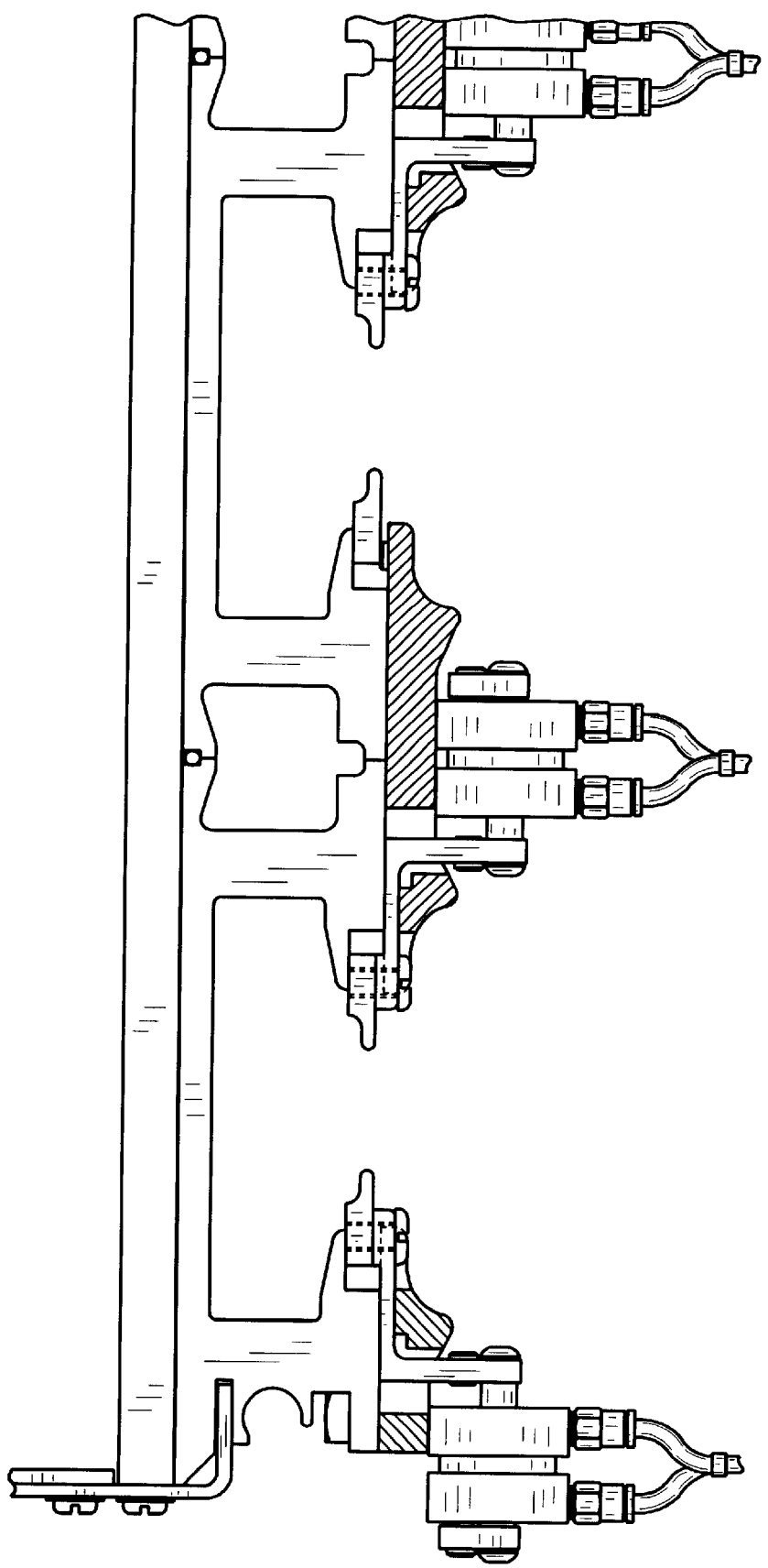
FIG. 1 is a partial end view of one type of multichannel air conveyor with which the apparatus of the invention may be employed.

FIG. 1 shows a partial end view of one type of multi-channel air conveyor with which the neck ring change-over and vertical pivot apparatus of the invention may be employed. These types of air conveyors can have two or more conveying channels extending parallel with each other along the length of the conveyor section. Single channel air conveyors of this type are described in the of Ouellette, U.S. Pat. No. 5,628,588, issued May 13, 1997. Multichannel air conveyors of this type having mechanisms that automatically adjust the spacing between the opposed pairs of flanges for each channel between two laterally adjusted positions are described in the pending of Ouellette, U.S. patent application Ser. No. 09/228,831. Both the patent and application are assigned to the assignee of the present application and are incorporated herein by reference.

Figure 2:
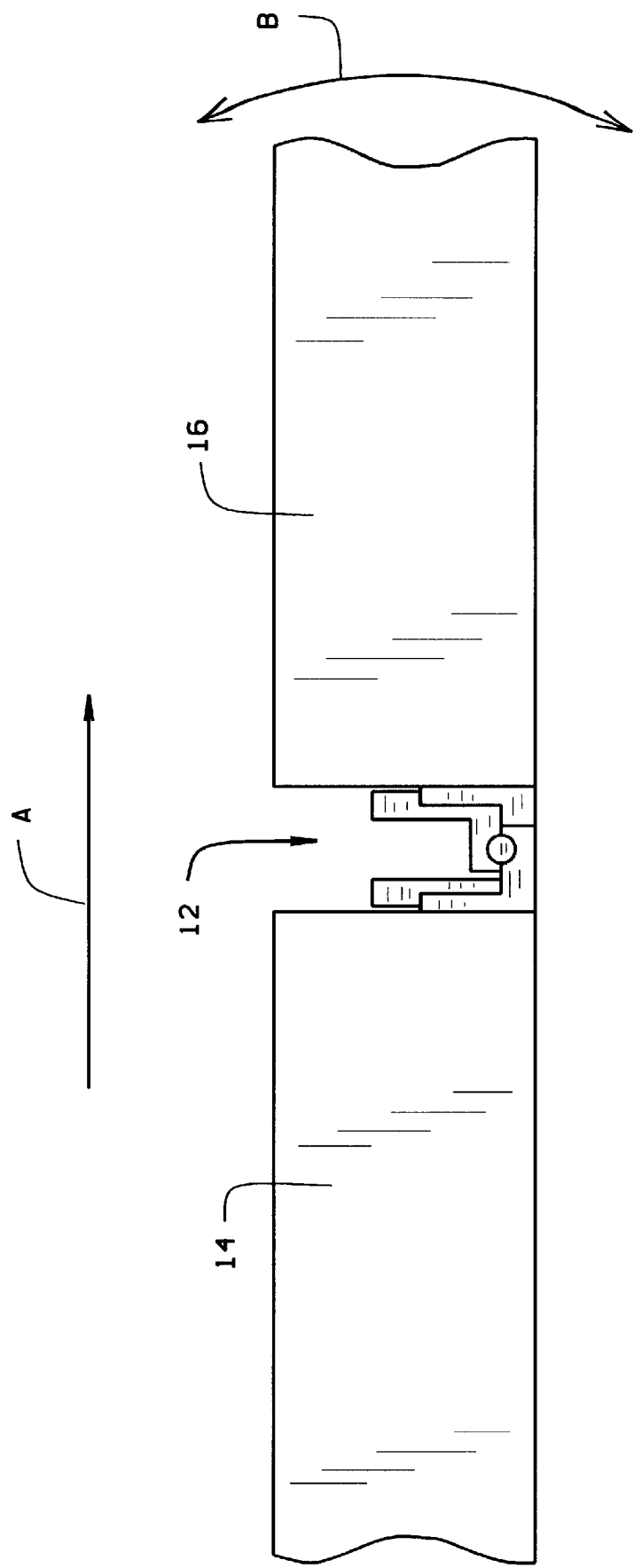
FIG. 2 is a schematic representation of a side elevation view of an upstream multichannel air conveyor section pivotally coupled to a downstream multichannel air conveyor section by the apparatus of the invention.

FIG. 2 is a schematic representation of the neck ring change-over and vertical pivoting apparatus 12 of the invention. The apparatus 12 is shown providing a vertical pivoting connection between an upstream length 14 of a multichannel air conveyor and a downstream length 16 of a multichannel air conveyor. The direction of the conveyed stream of bottles is indicated by the horizontal arrow A in FIG. 2. The pivoting apparatus 12 of the invention provides the combined benefits of a pivoting connection between the two conveyor sections 14, 16 that enables the downstream section 16 to pivot vertically as represented by the arced line B in FIG. 2, and also provides a connection between the two lengths of multichannel air conveyors of the type having opposed pairs of flanges that can be laterally adjusted relative to each other. The coupling also has opposed pairs of laterally spaced flanges. The lateral spacing between each pair of flanges can be automatically adjusted to match that of the two conveyor sections the coupling connects.

Figure 3:
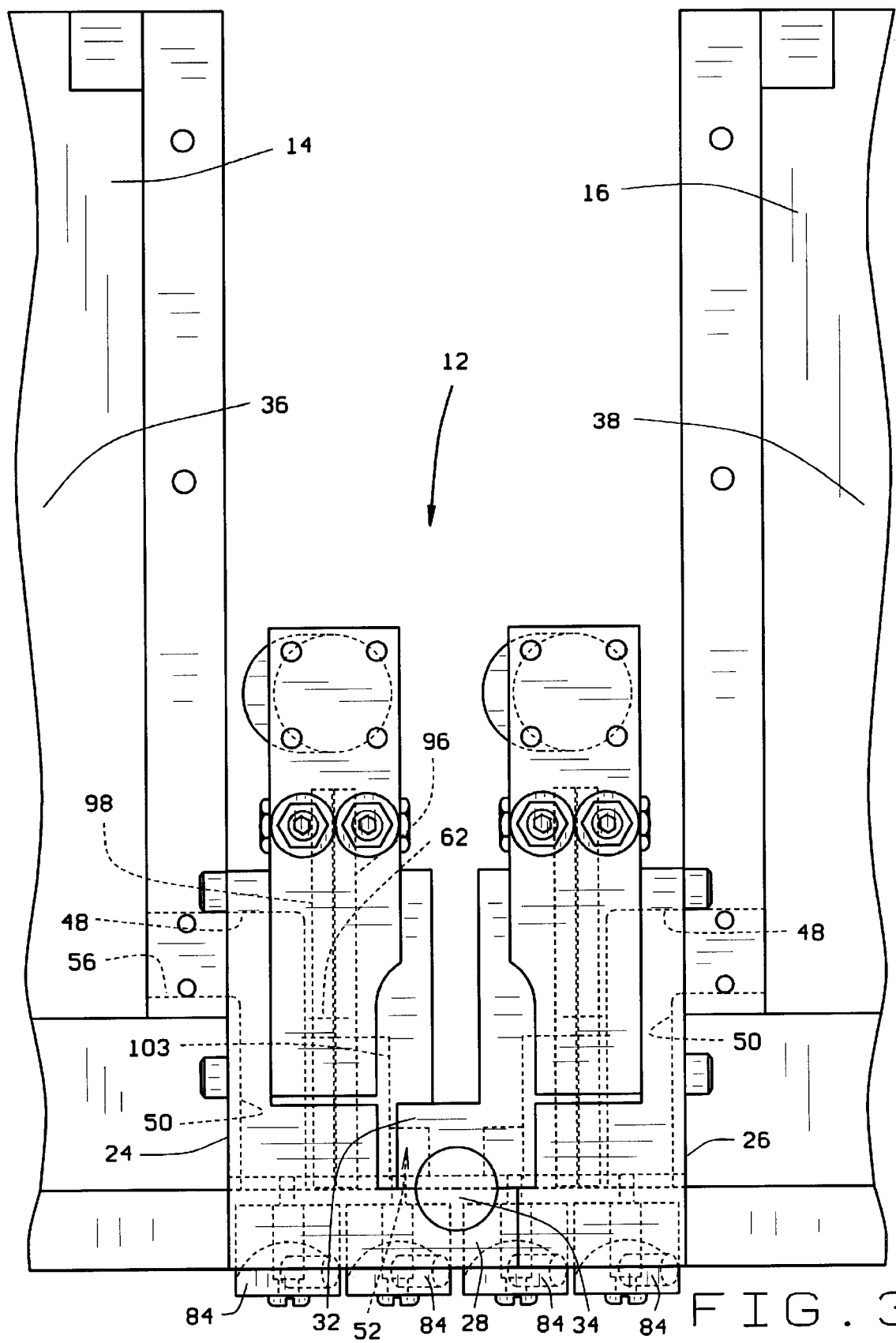
FIG. 3 is a detailed side elevation view of the multichannel neck ring change-over and vertical pivot apparatus of the invention.
Figure 13:
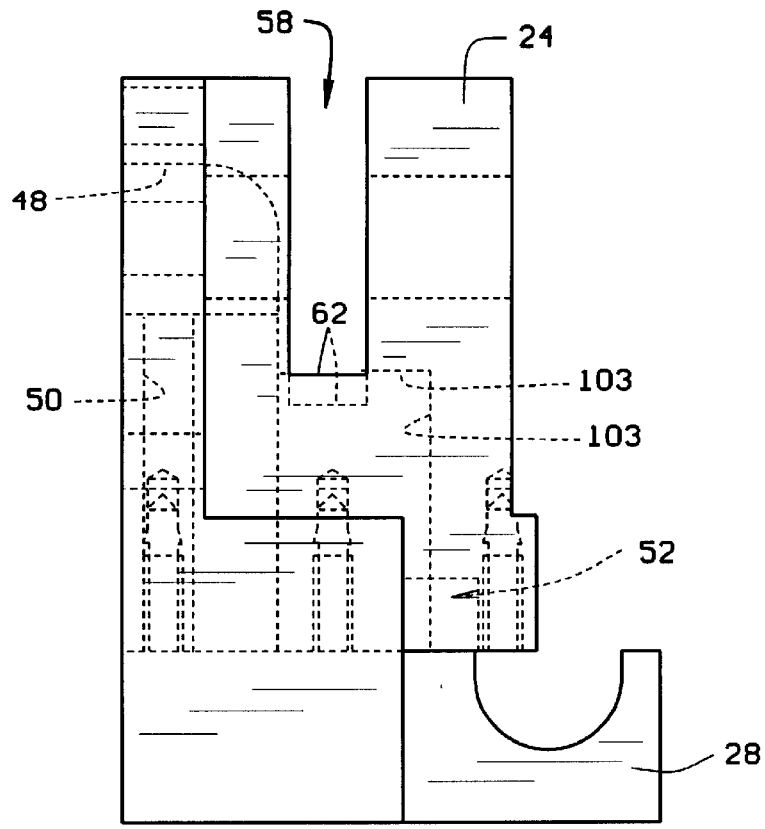
FIGS. 13 and 14 are side views of the two base sections of the apparatus showing their pivot connections.
Figure 14:
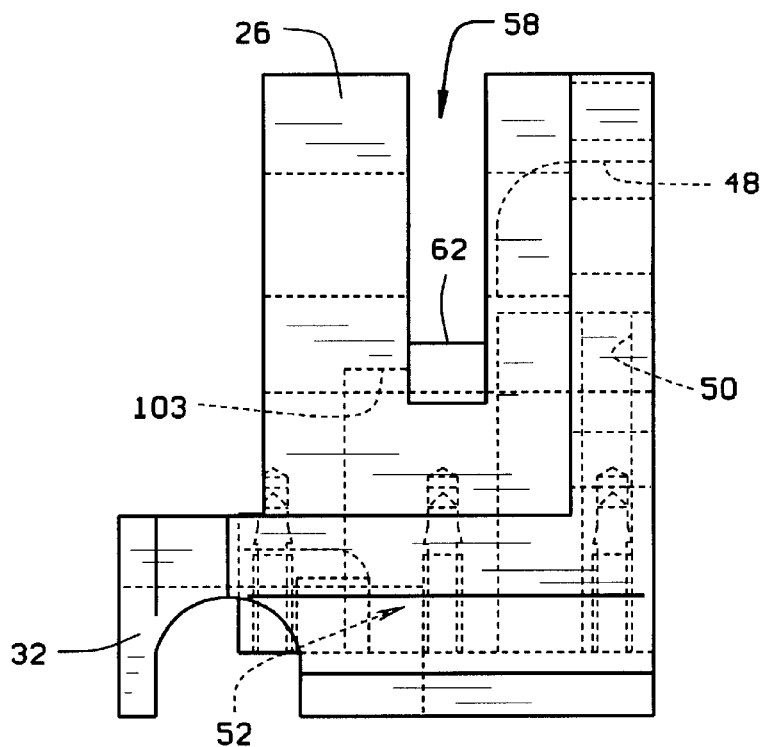

FIG. 3 is an enlarged view of the apparatus schematically represented in FIG. 2. The apparatus includes an upstream base 24 and a downstream base 26 connected together by two pivot connections on laterally opposite sides of the pair of bases. In viewing FIG. 3, the longitudinal flow direction is from left to right. FIG. 13 shows the upstream base 24 disassembled from the upstream air conveyor and the downstream base. FIG. 14 shows the downstream base 14 disassembled from the downstream air conveyor and the upstream base. In FIGS. 13 and 14 it can be seen that the pivot connections on the laterally opposite ends of the two bases are comprised of a pair of lower hinge knuckles 28 projecting from the upstream base 24 and a pair of upper hinge knuckles 32 projecting from the downstream base 26. A cylindrical pivot pin 34 is positioned between each opposing lower hinge knuckle 28 and upper hinge knuckle 32 on laterally opposite sides of the pair of bases 24, 26 and together with the hinge knuckles forms the pivoting connections at the laterally opposite sides of the bases.

Figure 4:
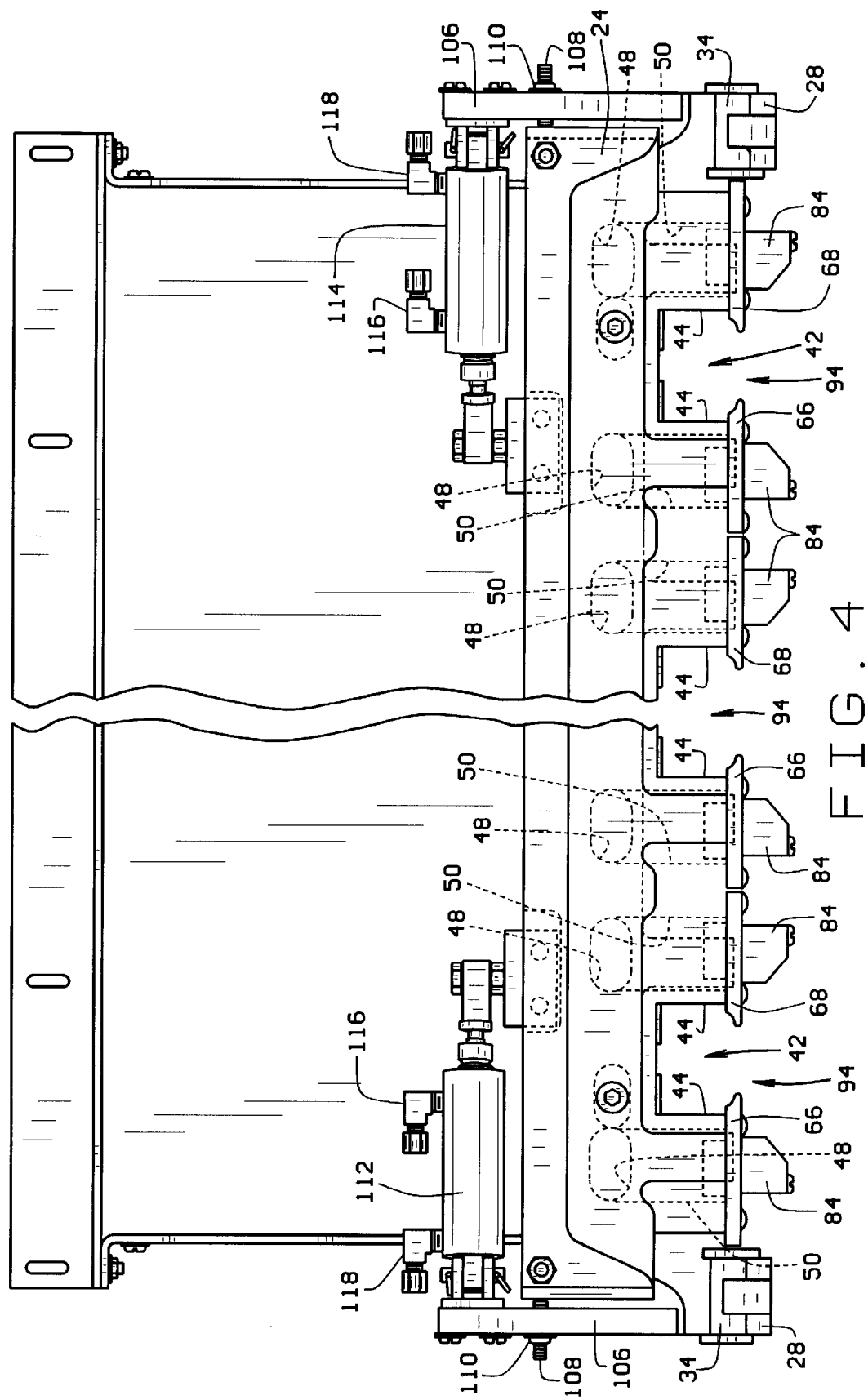
FIG. 4 is an end elevation view of one base section of the apparatus of the invention.

FIG. 4 shows the pair of pivot pins 34 set on the lower hinge knuckles 28 of the upstream base 24 with the downstream base 26 removed. With the pivot connection provided by the pair of pivot pins 34 and the lower 28 and upper 32 hinge knuckles, the downstream air conveyor 16 is free to pivot vertically relative to the generally horizontal upstream air conveyor 14 either inclining the downstream air conveyor upwardly or downwardly as represented by the arced arrow B in FIG. 2.

The upstream base 24 is connected to the upstream air conveyor 14 and receives a flow of air from the plenum 36 of the upstream air conveyor. In a like manner, the downstream base 26 is connected to the downstream air conveyor 16 and receives a flow of air from the plenum 38 of the downstream air conveyor. Both the upstream and the downstream bases are identical to each other except for their respective hinge knuckles, and therefore only the construction of the upstream base 24 will be further described.

Figure 10:
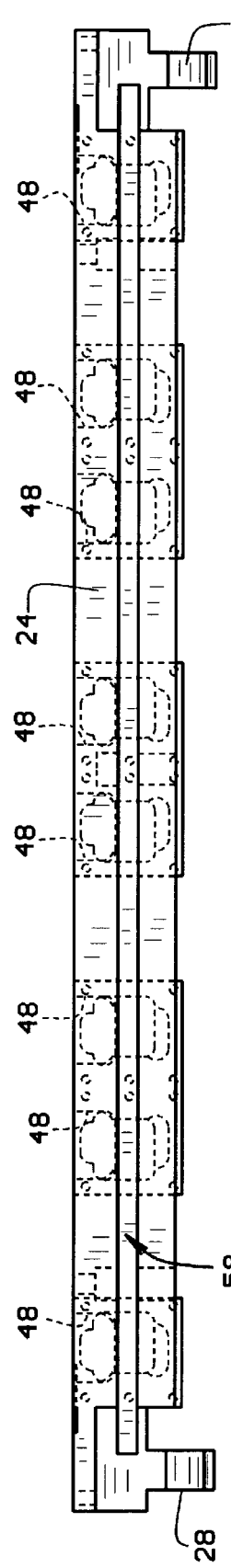
FIG. 10 is a plan view of the top of the base section of FIG. 7.

The upstream base 24 is machined from a block of metal such as aluminum, but may be constructed of other materials. It is formed with a general rectangular configuration having a lateral width that extends across the width of the upstream air conveyor 14 as shown in FIG. 4, and a much shorter longitudinal length as shown in FIG. 3. Referring to FIG. 4 which shows the upstream base assembled to the air conveyor 14, and FIG. 8 which shows the bottom of the upstream base disassembled from the air conveyor, the upstream base is provided with a multiple of longitudinally extending slots 42 formed into the underside of the base. Each of the slots is defined by opposed pairs of downwardly depending side walls 44 of the base that extend along opposite sides of the slots. The number of slots 42 corresponds to the number of air conveying slots of the upstream and downstream air conveyor sections. Each of the slots aligns with one of the multiple of slots or channels of the upstream air conveyor. Each slot has an interior volume sufficiently large to allow the neck and neck ring of a plastic bottle to pass easily therethrough, as is conventional in the construction of these types of air conveyors. The base also has a plurality of air flow conducting passages machined into the base. These include horizontally extending air flow conducting passages 48, vertically extending air flow conducting passages 50 and horizontally extending air flow conducting pockets 52 that open through the bottoms of the sidewalls 44. In viewing FIGS. 3, 9 and 10, it can be seen that the horizontal air flow conducting passages 48 enter the base from the side of the base attached to the upstream air conveyor 14. These horizontal air flow conducting passages 48 receive a flow of air from communicating passages 56 of the plenum 36 of the upstream air conveyor. Referring to FIGS. 3, 13 and 14, the horizontal air flow conducting passages 48 extend longitudinally into the base and intersect with the vertical air flow passages 50. As shown in FIGS. 7–9, an equal number of vertical air flow conducting passages 50 intersect with the horizontal air flow conducting passages 48 and extend downwardly therefrom to the pockets 52 that open through the bottom of the base 24. These vertical air flow conducting passages 50 receive the flow of air from the horizontal air flow conducting passages 48 and channel the flow of air downwardly to the air flow pocket openings 52 in the bottom of the base 24. A lateral slot 58 is also cut into the middle of the base 24 from the top surface of the base. As shown in FIGS. 7 and 9, the lateral slot 58 extends downwardly about half way through the height of the base 24 to a bottom sliding surface 62 of the slot. As shown in FIGS. 3, 7, 9, 13 and 14, vertical finger passages 103 intersect with the lateral slot 58 at the bottom of the slot and extend downwardly to the bottoms of the base side walls 44. These additional vertical finger passages 103 will be further described later.

Figure 15:
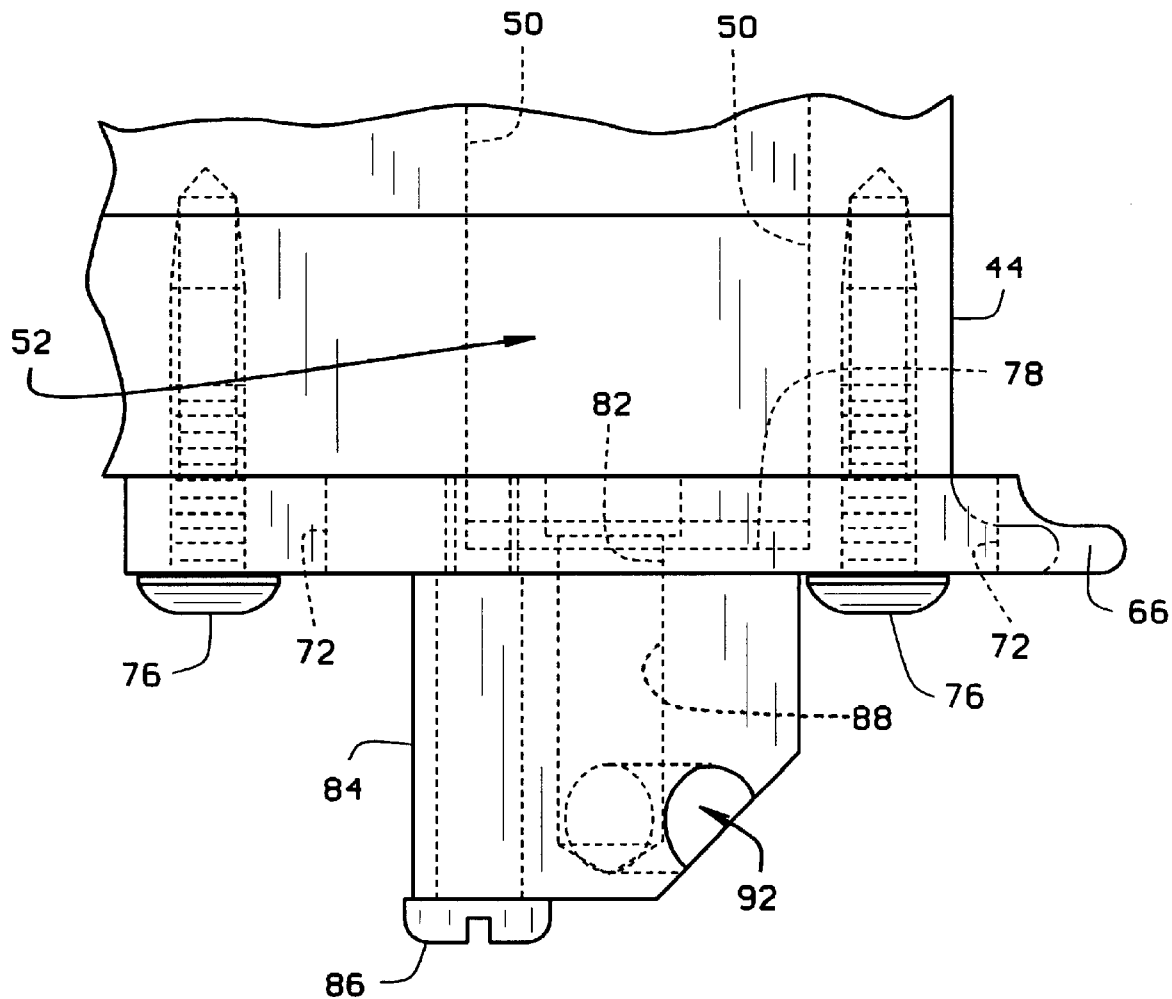
FIG. 15 is a partial elevation view of a flange and nozzle head of the apparatus of the invention.

As shown in FIGS. 4 and 6, pairs of mutually opposed first 66 and second 68 flanges are mounted on the bottoms of the base side walls 44. The detail of one of the flanges 66 is shown in FIG. 15. The first flange 66 of each pair has three oblong slots 72 and the second flange 68 of the pair has four oblong slots 74, the slots extending laterally. Threaded fasteners 76 pass through the slots of the pairs of flanges thereby mounting the flanges to the base side walls 44 for laterally reciprocating movement toward and away from each other as shown in FIG. 15. The fasteners 76 are not tightened down so the flanges 66, 68 are free to reciprocate toward and away from each other. The fasteners are of the type such as NYLOK® fasteners that will not back out on vibration. Each flange is also provided with a recess 78 in its top surface and an air flow passage 82 that passes through the flange also as shown in FIG. 15. Pairs of nozzle heads 84 are secured by a fastener 86 to the bottoms of each of the flanges. Each of the nozzle heads 84 has an air flow passage 88 passing therethrough that emerges from the nozzle head through an outlet orifice 92 as shown in FIG. 15. The orientation of the nozzle heads 84 and the outlet orifices 92 directs jets of air towards the conveying slots 94 defined between each pair of opposed flanges 66, 68 to contact bottles and convey bottles through the slots in a downstream direction just as in the air conveyors 14, 16 and air conveyors of the type disclosed in the earlier referenced patents. The nozzle heads 84 reciprocate with the pairs of flanges 66, 68 laterally toward and away from each other. As best seen in FIG. 15, the air flow passage 88 of the nozzle head communicates with the flange air flow passage 82 which in turn communicates with the air flow pocket opening 52 in the bottom of the sidewall 44. The bottom pocket opening 52 communicates with one of the vertical air flow conducting passages 50 of the base side wall 44. The bottom pocket opening 52 is sufficiently large horizontally so that it will remain in communication with the flange air flow passage 82 and the nozzle head air flow passage 88 when the flange is reciprocated between its two laterally adjusted positions. In this way, each of the nozzle heads 84 is provided with a flow of air when each of the opposed pairs of flanges 66, 68 is laterally adjusted between their two laterally spaced positions. As seen in FIG. 3, the pivot connection between the upstream base 24 and the downstream base 26 positions the two bases sufficiently close to each other to enable the nozzle heads 84 of each base to convey bottles across the pivot connection despite the angled orientation of the downstream base 26 relative to the upstream base 24. In this manner, the change-over and pivot apparatus 12 of the invention provides a pivoting connection between the upstream air conveyor 14 and the downstream air conveyor 16 that conveys streams of plastic bottles across the connection between the two conveyors despite the angled orientation of the downstream air conveyor 16 relative to the upstream air conveyor.

Figure 11:
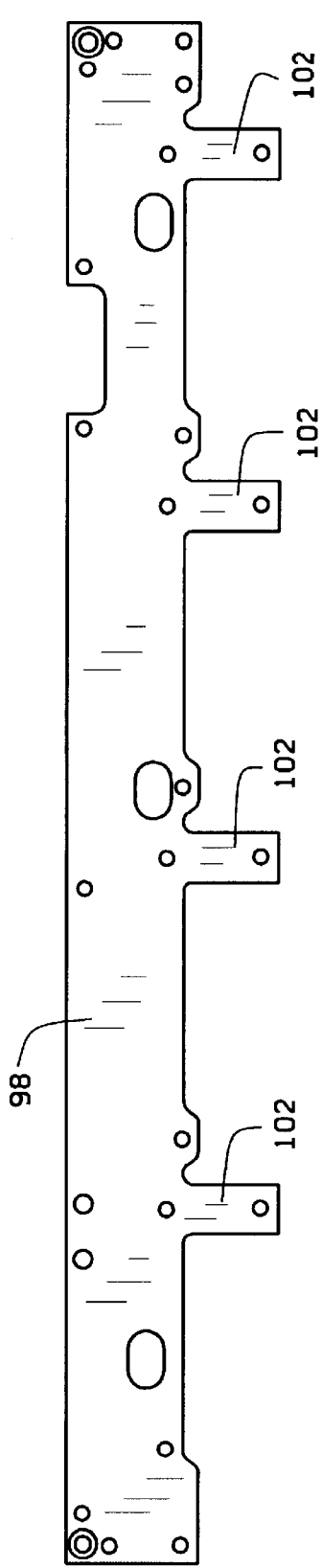
FIGS. 11 and 12 are elevation views of a pair of racks employed in the base section of FIG. 4.
Figure 12:
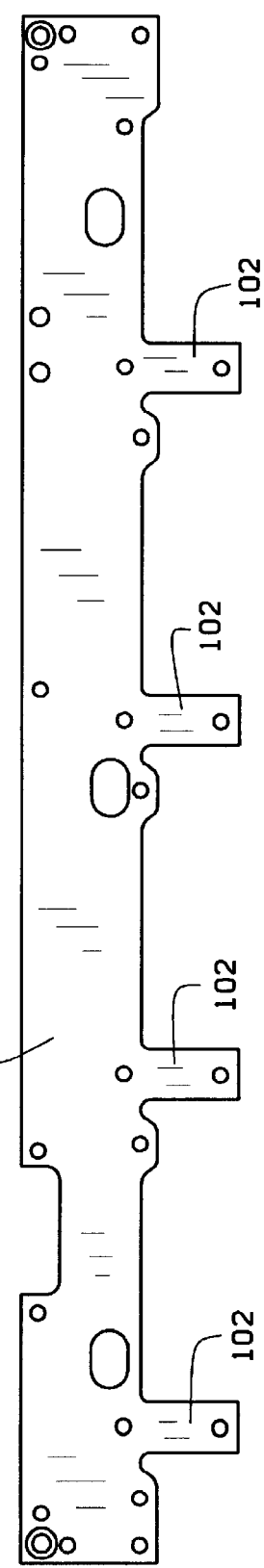

A pair of laterally extending racks 96, 98 are mounted in the lateral slot 58 of the base 24 for laterally reciprocating sliding movement across the bottom sliding surface 62 of the slot. The side-by-side positioning of the racks 96, 98 is shown in FIG. 5. The racks are shown removed from the base in FIGS. 11 and 12. In FIGS. 11 and 12, it can be seen that the racks are mirror images of each other. Each of the racks has a plurality of downwardly depending fingers 102. With the two racks assembled side-by-side in the lateral slot 58 of the base 24, the fingers 102 of the first rack 96 extend downwardly through the vertical finger passages 103 in the base side walls 44 and into the flange recesses 78 of the first flanges 66. The fingers 102 of the second rack 98 also extend downwardly through the vertical finger passages 103 of the base 24 and into the flange recess 78 of the second flanges 68. It should be appreciated that as each of the racks 96, 98 is moved between two laterally reciprocated positions in the base lateral slot 58, the fingers 102 of the racks move in their associated finger passages 103 and move the opposed pairs of flanges 66, 68 laterally toward each other and laterally away from each other between two laterally spaced positions of the flanges. As shown in FIG. 4, a pair of brackets 106 are mounted on the opposite lateral ends of the base 24 and a set screw 108 with a lock nut 110 is screw threaded through each of the brackets. The extent to which the set screws 108 are screw threaded through the brackets adjusts the lateral reciprocating movement of the racks 96, 98 in the base lateral slot 58. In the preferred embodiment, the extent of lateral movement of the racks is adjusted so that as they are reciprocated through their two positions, they move the opposed pairs of flanges 66, 68 between a lateral spacing that accommodates a typical 28 mm thread diameter bottle neck and a lateral spacing that accommodates a typical 38 mm thread diameter bottle neck. However, the adjustment of the reciprocating movement of the racks can be varied to accommodate other bottle sizes.

The actuator mechanism of the apparatus that drives the reciprocating movement of the first and second racks is provided by first 112 and second 114 pneumatic actuators. As shown in FIGS. 4 and 5, each of the actuators 112, 114 is a double-acting piston-cylinder actuator. Each actuator has an air inlet 116 for retracting the piston and piston rod into the actuator cylinder and a second air inlet 118 for extending the piston rod from the cylinder, as is conventional. By the selective supply of air pressure to the two air inlets, the piston rods of the actuators can be controlled to be simultaneously extended, thereby moving the opposed pairs of flanges 66, 68 laterally toward each other, or retracted thereby moving the pairs of opposed flanges 66, 68 laterally away from each other. A control system (not shown) for the apparatus selectively supplies air pressure to the first and second actuators to cause the piston rods extending from the actuators to be reciprocated between the first and second, extended and retracted, positions. The piston rods of the first and second actuators are connected to the first and second racks 96, 98 respectively. Thus, when the first and second actuators are selectively supplied with pressure to control the piston rods to be extended and retracted, the first and second racks are laterally reciprocated in the base slot 58 and the first and second flanges 66, 68 of each pair of flanges are moved between their first lateral spacing and second lateral spacing.

Thus, the apparatus of the invention provides a compact pivoting connection between upstream and 35 downstream multichannel air conveyors. The apparatus is also capable of simultaneously adjusting the lateral width dimensions of the slots between opposed pairs of flanges of the pivoting connection to match the adjusted lateral width dimensions of the multichannel upstream and downstream air conveyors.

While the present invention has been described by reference to a specific embodiment, it should be understood that modifications and variations of the invention may be constructed without departing form the scope of the invention defined in the following claims.

What is claimed:

1. A longitudinally extending conveyor having a multiple of conveyor paths, the conveyor comprising:

a multiple of pairs of longitudinally extending flanges arranged laterally side-by-side, each pair of flanges having a first flange and a second flange with a lateral spacing between each pair of flanges that defines a longitudinally extending slot of each conveyor path of the multiple conveyor paths; and an actuator mechanism operatively connected to at least the first flange of each pair of flanges, the actuator mechanism being operable to move the first flange of each pair of flanges simultaneously and laterally between first and second laterally spaced positions relative to the second flange of each pair of flanges.

2. The conveyor of claim 1, wherein:

the conveyor is an air conveyor and a plurality of air ejecting orifices are arranged along the pairs of longitudinally extending flanges and are oriented to eject jets of air toward the longitudinally extending slots defined by the pairs of flanges.

3. The conveyor of claim 2, wherein:

a plurality of nozzle heads are suspended below and arranged along the pairs of longitudinally extending flanges and the plurality of air ejecting orifices are on the plurality of nozzle heads.

4. The air conveyor of claim 3, wherein:

the plurality of nozzle heads are attached to the first and second flange of each pair of flanges.

5. The conveyor of claim 1, wherein:

the actuator mechanism is adjustable to adjust sizes of the first and second laterally spaced positions between the first flange and the second flange of each pair of flanges.

6. The conveyor of claim 1, wherein:

the actuator mechanism includes a rack mounted on the conveyor for lateral reciprocating movement, and the rack has a plurality of fingers that project from the rack and engage with the first flanges of the pairs of flanges.

7. The conveyor of claim 6, wherein:

the conveyor includes a base, the base has a lateral slot and the rack is received in the slot for laterally reciprocating movement.

8. The conveyor of claim 7, wherein:

the base is connected to an air plenum that provides a flow of air to the base, the base has air flow conducting passages that pass through the base and communicate the air ejecting orifices with the air plenum.

9. The conveyor of claim 1, wherein:

the actuator mechanism includes first and second racks that are mounted on the conveyor for lateral reciprocating movement, the first rack is operatively connected to the first flanges of each of the pairs of flanges and the second rack is operatively connected to the second flanges of each of the pairs of flanges.

10. The conveyor of claim 9, wherein:

the actuator mechanism includes a first actuator connected to the conveyor and the first rack, and a second actuator connected to the conveyor and the second rack, where the first and second actuators are operable to laterally reciprocate the first and second racks.

11. The conveyor of claim 9, wherein:

the actuator mechanism is operable to laterally reciprocate the first and second racks in directions toward each other and away from each other.

12. The conveyor of claim 9, wherein:

the conveyor includes a base, the base has a lateral slot and the first and second racks are received in the slot for laterally reciprocating movement of the racks relative to the slot and relative to each other.

13. The conveyor of claim 12, wherein:

the conveyor is an air conveyor including an air plenum that directs a flow of air, the base is connected to the air plenum and receives a flow of air from the plenum, the base has air flow conducting passages that pass through the base and communicate the air ejecting orifices with the air plenum.

14. The conveyor of claim 13, wherein:

a plurality of nozzle heads are suspended below and arranged along the pairs of longitudinally extending flanges, and the air flow passages of the base communicate with the plurality of nozzle heads.

15. A longitudinally extending air conveyor having at least one conveyor path, the air conveyor path comprising:

at least one pair of longitudinally extending flanges, the one pair of flanges including a first and second flange with a lateral spacing between the first and second flanges that defines a longitudinally extending slot of the conveyor path;

an actuator mechanism operatively connected to the first and second flanges, the actuator mechanism being operable to move the first and second flanges between first and second laterally spaced positions relative to each other; and a plurality of air ejecting orifices arranged along the first and second flanges and oriented to eject jets of air toward the longitudinally extending slot defined by the one pair of flanges, the plurality of orifices being moveable with the first and second flanges between the first and second laterally spaced positions of the flanges.

16. The air conveyor of claim 15, wherein:

a plurality of nozzle heads are suspended below and arranged along the pair of longitudinally extending flanges and the plurality of air ejecting orifices are on the plurality of nozzle heads.

17. The air conveyor of claim 15, wherein:

the actuator mechanism includes a first rack mounted on the air conveyor for laterally reciprocating movement, the first rack has at least one finger that extends from the rack and engages with the first flange, and the actuator mechanism includes a second rack mounted on the air conveyor for laterally reciprocating movement, the second rack has at least one finger that extends from the rack and engages with the second flange, where the fingers of the first and second racks move the first and second flanges between the first and second laterally spaced positions in response to laterally reciprocating movements of the first and second racks.

18. The air conveyor of claim 17, wherein:

the air conveyor includes an air plenum and a base attached to the plenum, the base has a lateral slot and the first and second racks are received in the slot for laterally reciprocating movement relative to the base.

19. The air conveyor of claim 18, wherein:

the air plenum provides a flow of air to the base and the base has air flow conducting passages that pass through the base and communicate the air ejecting orifices with the plenum.

* * * * *